United States Patent
Li et al.

(10) Patent No.: US 10,680,851 B2
(45) Date of Patent: Jun. 9, 2020

(54) METHOD, APPARATUS, AND DEVICE FOR PPTP VPN BASED ACCESS ACCELERATION

(71) Applicant: WANGSU SCIENCE & TECHNOLOGY CO., LTD., Shanghai (CN)

(72) Inventors: Tengchao Li, Shanghai (CN); Xiaopeng Liu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 51 days.

(21) Appl. No.: 16/082,719

(22) PCT Filed: Nov. 16, 2016

(86) PCT No.: PCT/CN2016/106057
§ 371 (c)(1),
(2) Date: Sep. 6, 2018

(87) PCT Pub. No.: WO2018/049725
PCT Pub. Date: Mar. 22, 2018

(65) Prior Publication Data
US 2019/0097840 A1    Mar. 28, 2019

(30) Foreign Application Priority Data
Sep. 14, 2016   (CN) .......................... 2016 1 0825161

(51) Int. Cl.
*H04J 3/24*      (2006.01)
*H04L 12/46*     (2006.01)
*H04L 29/12*     (2006.01)
*H04L 29/06*     (2006.01)

(52) U.S. Cl.
CPC ...... *H04L 12/4633* (2013.01); *H04L 12/4641* (2013.01); *H04L 61/2007* (2013.01); *H04L 63/0272* (2013.01); *H04L 67/42* (2013.01)

(58) Field of Classification Search
None
See application file for complete search history.

(56) References Cited

U.S. PATENT DOCUMENTS 6,377,571 B1    4/2002  Tai
8,458,453 B1 *  6/2013  Mahalingaiah ....... H04L 12/462
                                                    713/153
(Continued)

FOREIGN PATENT DOCUMENTS

CN    202957840 U    5/2013
CN    103391234 A    11/2013
CN    104935490 A    9/2015

OTHER PUBLICATIONS

The European Patent Office (EPO) The Extended European Search Report for 16916105.6 (PCT/CN2016/106057) dated Jun. 4 2019 10 Pages.

(Continued)

*Primary Examiner* — Bob A Phunkulh
(74) *Attorney, Agent, or Firm* — Anova Law Group, PLLC (57) ABSTRACT

The present disclosure provides a method, apparatus, and device for PPTP VPN based access acceleration. A PPTP VPN system includes a client-side, a first server, a VPN server, and a second server cluster supporting a GRE protocol connected between the first server and the VPN server. When the client-side starts an accelerated access, the first server receives a first PPTP message and a first GRE message from a same client-side, and encapsulates the first GRE message. An encapsulated first GRE message and the first PPTP message are send to a same second server. The first GRE message is encapsulated and the source addresses of the first GRE message and the first PPTP message are changed. Therefore, the reliability of the transmission can be achieved. Reverse transmission is no difference. The present disclosure accelerates the access speed of the VPN server and improves the access quality of the user.

17 Claims, 5 Drawing Sheets

(56) References Cited

U.S. PATENT DOCUMENTS

| | | | | |
|---|---|---|---|---|
| 2004/0013118 | A1* | 1/2004 | Borella | H04L 12/4633 370/395.2 |
| 2008/0195733 | A1* | 8/2008 | Detienne | H04L 12/4633 709/224 |
| 2009/0222906 | A1* | 9/2009 | Brandstatter | H04L 63/0272 726/15 |
| 2011/0274108 | A1* | 11/2011 | Fan | H04L 12/4633 370/390 |
| 2012/0087356 | A1* | 4/2012 | Wentink | H04L 12/2859 370/338 |
| 2015/0067819 | A1* | 3/2015 | Shribman | H04L 67/06 726/12 |
| 2017/0013508 | A1* | 1/2017 | Pallas | H04W 28/08 |

OTHER PUBLICATIONS

Lucy Yong(ED)Huawei Technologies E Crabbe Oracle X Xu Huawei Technologies I Herbert Facebook GRE-in-UDP Encapsulation ; draft-ietf-tsvwg-gre-in-udp-encap-18.txt GRE-In-UDP Encapsulaton;draft-ietf-tsvwg-gre-in-udp-encap-18.txt,IETF; StandardWorkingDraft,Internet Society(ISOC)4, Rue Des Falaises CH-1205 Geneva.

Hamzeh, K, Ascend Cummunications G S Pall Microsoft Corporation W Verthein 3COM J Taarud Copper Mountain Networks W A Little ECI Telem Point-to-point Tunneling Protocol (PPTP); draft-ietf-pppext-pptp-10.txt Point-To-Point Tunneling Protocol (PPTP); draft-ietf-pppext-pptp-10. txt,IETF; StandardWorkingDraft,Internet Society (ISOC)4, Rue Des Falaises CH- 1205 Geneva.

Garg ED Y Wang ED Microsoft P NVGRE: Network Virtualization using Generic Routing Encapsulation; draft-sridharan-virtualization-nvgre-08. txt NVGRE: Network Virtualization Using Generic Routing Encapsulation; draft-sridharan-virtualization-nvgre-08.txt;Internet-Draft: Network Working Group,; StandardWorkingDraft, Internet Society(ISOC)4, Ruedes Fal.

The World Intellectual Property Organization (WIPO) International Search Report for PCT/CN2016/106057 dated May 31, 2017 5 Pages.

* cited by examiner

METHOD, APPARATUS, AND DEVICE FOR PPTP VPN BASED ACCESS ACCELERATION

CROSS-REFERENCE TO RELATED APPLICATIONS

This application is a national phase entry under 35 U.S.C. § 371 of International Application No. PCT/CN2016/106057, filed on Nov. 16, 2016, which claims priority to Chinese applications No. 201610825161.3, filed on Sep. 14, 2016, the content of all of which is incorporated herein by their reference.

FIELD OF THE DISCLOSURE

The present disclosure generally relates to network security technology and, more particularly, to a method, apparatus, and device for PPTP VPN based access acceleration.

BACKGROUND

PPTP (Point to Point Tunneling Protocol) is a network technology for supporting multiprotocol virtual private network (VPN), which works on a second layer. Based on the PPTP protocol, a remote user can secure access to a corporate network via Microsoft Windows NT Workstation, Windows XP operating system, Windows 2000 operating system, Windows 2003 operating system, Windows7 operating system, and other systems installed with a point-to-point protocol. The remote user can dial into a local ISP, and securely link to the corporate network over the Internet.

The basic process of tunneling technology is that at an interface between a source LAN and a public network, data (e.g., data from the data link layer or the network layer in the seven-layer ISO/OSI model) as a payload is encapsulated in a data format that can be transmitted over the public network, and at an interface between a destination LAN and the public network, the payload can be taken out by de-encapsulating the data.

The VPN built by using the PPTP has relatively strong stability and security, and PPTP is also used by relatively mainstream VPN servers nowadays. There are multiple VPN access scenarios using PPTP, for example, employees who travel for work can use the VPN to access the enterprise internal network, and subsidiaries can use the VPN to access the parent enterprise internal network. However, this way of access has cross-regional and cross-carrier factors. The poor access quality and slow access speed make it difficult to meet the need of customer on access quality.

Figure 1:
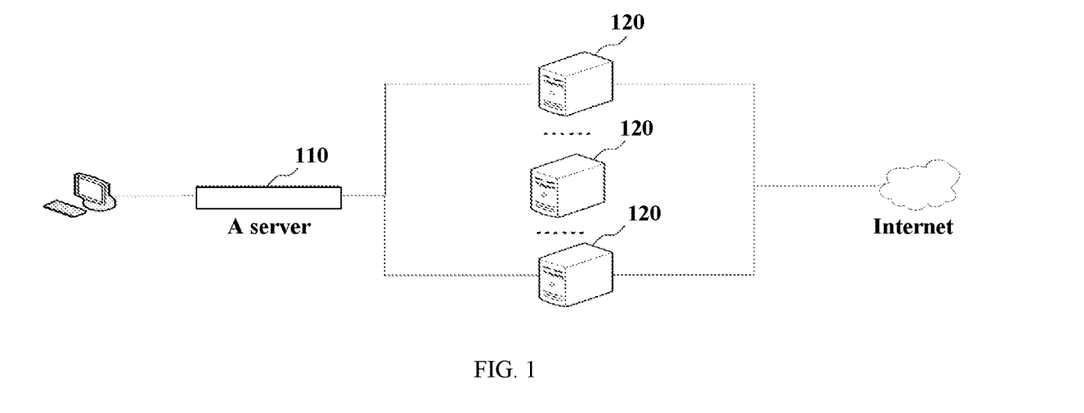
FIG. 1 is a schematic diagram of a conventional agent system.

Currently, a relatively common agent system is shown in FIG. 1. A server 110 is arranged on a client-side router, which intercepts TCP (Transmission Control Protocol) traffic, and/or UDP (User Datagram Protocol) traffic, and the like. The intercepted traffic is forwarded to a nearest B server 120 via a dedicated high-speed network for back-to-the-source. Thereby, the access speed can be greatly enhanced. However, the agent system as shown in FIG. 1 does not support the GRE protocol (Generic Routing Encapsulation). Therefore, the agent system cannot accelerate the PPTP VPN traffic.

SUMMARY

In view of the above-mentioned drawbacks of the conventional technology, the objectives of the present disclosure is to provide a method, apparatus, and device for PPTP VPN based access acceleration to solve the problem that PPTP VPN based transparent agent system does not support the GRE protocol and cannot accelerate the PPTP VPN traffic.

To achieve the above-mentioned objectives and other related objectives, the present disclosure provides a method for PPTP VPN based access acceleration, wherein a PPTP VPN system includes a client-side, a first server, a VPN server, and a second server cluster supporting a GRE protocol connected between the first server and the VPN server, and the second sever cluster is an acceleration system. The method for PPTP VPN based access acceleration comprises: receiving a first PPTP message and a first GRE message from a same client-side; for the first PPTP message, sending the first PPTP message to the second server; and for the first GRE message, encapsulating the first GRE message based on a first network communication protocol and sending the encapsulated first GRE message to the second server receiving the first PPTP message.

According to an embodiment of the present disclosure, the first network communication protocol is a network communication protocol that supports the transmission of data packets between the first server and a second server in the process of network communication.

According to an embodiment of the present disclosure, the first sever is connected with the client-side or the first server is a virtual server arranged on the client-side.

According to an embodiment of the present disclosure, IP (Internet Protocol) addresses of the client-side are extracted from the first PPTP message and the first GRE message, respectively; a Hash calculation is performed on the IP address of the client-side extracted from the first PPTP message to obtain an IP address of the second server, and according to the IP address of the second server obtained from the Hash calculation, the first PPTP message is sent to the second server; and the Hash calculation is performed on the IP address of the client-side extracted from the first GRE message to obtain an IP address same as the IP address of the second server obtained by calculating according to the first PPTP message, and the first PPTP message and the encapsulated first GRE message are sent to the same second server.

According to an embodiment of the present disclosure, the second server in the second server cluster is obtained by screening through GRE message interactive communication with a preset GRE protocol simulation test server.

According to an embodiment of the present disclosure, the method for PPTP VPN based access acceleration further includes: receiving a second PPTP message and an encapsulated second GRE message from the VPN server; de-encapsulating the encapsulated second GRE message based on the first network communication protocol to obtain a second GRE message; extracting source addresses in the second PPTP message and the second GRE message, and changing the source addresses in the second PPTP message and the second GRE message to the IP address of the client-side; and sending the second PPTP message and the second GRE message, of which the source addresses are changed to the IP address of the client-side, to the client-side.

The present disclosure also provides a PPTP VPN based access acceleration apparatus, wherein a PPTP VPN system includes a client-side, a first server, a VPN server, and a second server cluster supporting a GRE protocol connected between the first server and the VPN server, and the second sever cluster is an acceleration system. The PPTP VPN based access acceleration apparatus comprises: a first receive unit configured to receive a first PPTP message and a first GRE message from a same client-side and a second PPTP message, and to an encapsulated second GRE message from the VPN server that are fed back via the second server; a first encapsulation/de-encapsulation unit configured, based on the first network communication protocol, to encapsulate the first GRE message and de-encapsulate the encapsulated second GRE message; a first extraction processing unit configured to extract source addresses in the second PPTP message and a second GRE message, and change the source addresses in the second PPTP message and the second GRE message to an IP address of the client-side; and a first transmit unit configured to send the first PPTP message and an encapsulated first GRE message to the second server, and send the second PPTP message and the second GRE message, of which the source addresses are changed to the IP address of the client-side, to the client-side.

According to an embodiment of the present disclosure, the PPTP VPN based access acceleration apparatus according further includes: a first analysis processing unit configured to: extract the IP address of the client-side from the first PPTP message and the first GRE message, respectively; perform Hash calculation on the IP address of the client-side extracted from the first PPTP message to obtain an IP address of the second server; perform the Hash calculation on the IP address of the client-side extracted from the first GRE message to obtain an IP address same as the IP address of the second server obtained by calculating according to the first PPTP message; and the first transmit unit configured, according to analysis processing result of the first analysis processing unit, to send the first PPTP message and the encapsulated first GRE message to the same second server.

According to an embodiment of the present disclosure, the first network communication protocol is a network communication protocol that supports the transmission of data packets between the first server and a second server in the process of network communication.

The present disclosure also provides a method for PPTP VPN based access acceleration, wherein a PPTP VPN system includes a client-side, a first server, a VPN server, and a second server cluster supporting a GRE protocol connected between the first server and the VPN server, and the second sever cluster is an acceleration system. The method for PPTP VPN based access acceleration comprises: receiving a first PPTP message and an encapsulated first GRE message from a same client-side; de-encapsulating the encapsulated first GRE message according to a first internet communication protocol to obtain a first GRE message; extracting destination addresses and source addresses in the first PPTP message and the first GRE message, wherein the destination addresses are an IP address of the VPN server, and the source addresses are an IP address of the client-side; changing the source addresses of the first PPTP message and the first GRE message to an IP address of the second server; wherein the second server is arranged on the route between the first server and the VPN server and is closest to the VPN server; and according to the destination addresses, sending the first PPTP message and the first GRE message, whose source addresses are changed to the IP address of the second server, to the VPN server.

According to an embodiment of the present disclosure, the first network communication protocol is a network communication protocol that supports the transmission of data packets between the first server and a second server in the process of network communication.

According to an embodiment of the present disclosure, the first sever is connected with the client-side or the first server is a virtual server arranged on the client-side.

According to an embodiment of the present disclosure, the second server in the second server cluster is obtained by screening through GRE message interactive communication with a preset GRE protocol simulation test server.

According to an embodiment of the present disclosure, the method for PPTP VPN based access acceleration according further includes: receiving a second PPTP message and a second GRE message from the VPN server; encapsulating the second GRE message based on the first network communication protocol; and sending the second PPTP message and an encapsulated second GRE message to the first server.

The present disclosure also provides a PPTP VPN based access acceleration apparatus, wherein a PPTP VPN system includes a client-side, a first server, a VPN server, and a second server cluster supporting a GRE protocol connected between the first server and the VPN server, and the second sever cluster is an acceleration system. The PPTP VPN based access acceleration apparatus comprises: a second receive unit configured to receive a first PPTP message and an encapsulated first GRE message from the first server, and a second PPTP message and a second GRE message from the VPN server; a second encapsulation/de-encapsulation unit configured, based on the first network communication protocol, to encapsulate the first GRE message and de-encapsulate an encapsulated second GRE message; a second extraction processing unit configured to extract source addresses in the first PPTP message and a first GRE message, and change the source addresses in the first PPTP message and the first GRE message to an IP address of the second server, wherein the extracted IP addresses are an IP address of the client-side; and a second transmit unit configured to send the first PPTP message and the first GRE message, of which the source addresses are changed to the IP address of the second server, to the VPN server, and send the second PPTP message and an encapsulated second GRE message to the first server.

According to an embodiment of the present disclosure, the first network communication protocol is a network communication protocol that supports the transmission of data packets between the first server and a second server in the process of network communication.

The present disclosure also provides a device. The device utilizes the above-mentioned PPTP VPN based access acceleration apparatus.

As described above, the method, apparatus, and device for PPTP VPN provided by the present disclosure has the following beneficial effects:

Based on setting the GRE protocol simulation test server, the server cluster (the plurality of VPN servers that are connected between the first server and the VPN server) is detected to select the second servers that support the GRE protocol, thereby forming the second server cluster that support the GRE protocol.

The HASH algorithm is used to calculate the IP address of the same client-side so that the PPTP messages and GRE messages sent by the same client are transmitted over the same path. Therefore, the acceleration system can support the PPTP VPN access.

In order to ensure the stability of data transmission, GRE messages are encapsulated at the first server based on the TCP protocol. The quality of user access is improved.

After the second server cluster acceleration, the speed at which the user accesses the source station is greatly accelerated.

DESCRIPTION OF COMPONENTS AND LABELS

110 A server
120 B server
210 client-side
220 first server
230 second server cluster
231, 232 second servers
240 VPN server
310 GRE protocol simulation test server
S11~S12, S21~S25,
S31~S33, S41~S44 steps
500 PPTP VPN based access acceleration apparatus
510 first receive unit
520 first encapsulation/de-encapsulation unit
530 first extraction processing unit
540 first analysis processing unit
550 first transmit unit
600 PPTP VPN based access acceleration apparatus
610 second receive unit
620 second encapsulation/de-encapsulation unit
630 second extraction processing unit
640 second transmit unit

DETAILED DESCRIPTION

Hereinafter, implementation of the present disclosure will be described using specific embodiments. Other advantages and effects of the present disclosure will be apparent to a person skilled in the art from what is disclosed in this specification. The present disclosure may also be implemented or applied by other different embodiments. The details in the specification may also be modified or altered according to different perspectives and applications, without departing from the spirit of the present invention. It should be noted that, in the absence of any conflict, the following embodiments and the features of the embodiments may be combined with each other.

With Reference to the attached drawings, it should be noted that the drawings provided in the following embodiments merely illustrate the basic idea of the present invention in a schematic manner. Thus, the drawings merely show the components related to the present invention, rather than in accordance with the number, shape, and size of the components in actual implementation. In actual implementation, the type, quantity, and proportion of each component can be randomly changed, and the type of component layout may also be more complex.

Figure 2:
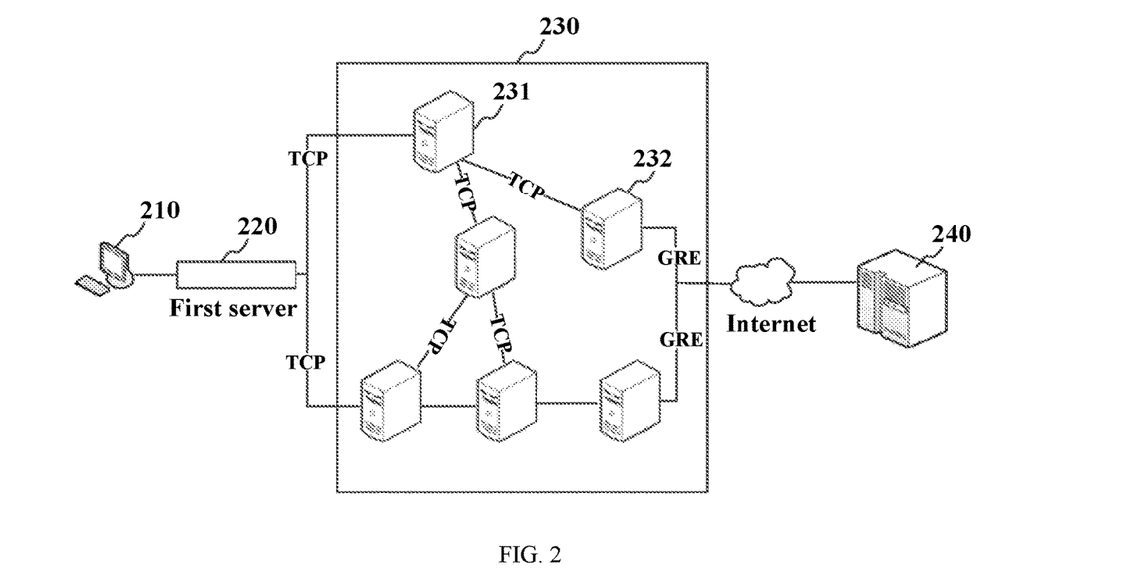
FIG. 2 is a schematic diagram of a PPTP VPN acceleration system according to embodiments of the present disclosure.

The present disclosure provides a method, apparatus, and device for PPTP VPN based access acceleration. The PPTP VPN system as shown in FIG. 2 includes a client-side 210, a first server 220, a second server cluster 230, and a VPN server 240. Via the PPTP VPN system, a user can establish a virtual data link between the client-side 210 and the VPN server 240.

The first server 220 may be a virtual server in the form of a software installed in the client-side 210 or a router, a gateway, and/or a switch connected to the client-side 210 over internet. As shown in FIG. 2, the first server 220 of the present embodiment is a router that is arranged at the client-side 210, and is connected to the client-side 210 via a network.

The second server cluster 230 includes a plurality of second servers that support the GRE protocol and the plurality of second servers are interconnected to each other.

Figure 3:
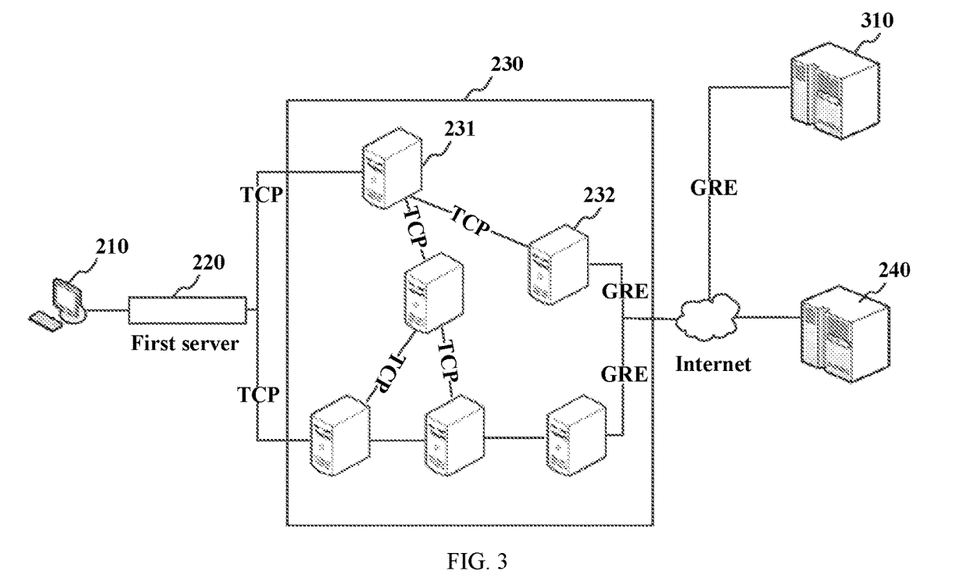
FIG. 3 is a schematic diagram of a PPTP VPN system for determining whether a second server in a server cluster supports a GRE protocol according to embodiments of the present disclosure.

In conventional VPN agent systems, not all servers can support the GRE protocol. There may be hundreds or thousands of servers connected between the first server 220 and the VPN server 240. However, the back-to-the-source server must support the GRE protocol. Moreover, the number of servers connected between the first server 220 and the VPN server 240 is extremely large. It is unrealistic to select out the servers that support the GRE protocol manually with manpower. Therefore, the present disclosure makes an intelligent decision on the plurality of servers connected between the first server 220 and the VPN server 240, from which second servers that support the GRE protocol are selected to form the second server cluster 230. As shown in FIG. 3, a GRE protocol simulation test server 310 (the GRE protocol simulation test server determines whether the GRE protocol transmission is supported manually with manpower) that supports the GRE protocol is arranged outside the PPTP VPN system. The GRE simulation server is connected to the server cluster (a plurality of servers connected between the first server 220 and the VPN server) via the Internet. In addition, in order to ensure the accuracy of the decision, one GRE protocol simulation test server 310 is arranged on each carrier line.

When performing the selection of the second servers that support the GRE protocol, simulating an interactive communication based on the GRE messages between the GRE protocol simulation test server 310 and the servers (the plurality of servers connected between the first server 220 and the VPN server) is performed, and the IP address of the GRE protocol simulation test server 310 is arranged on all the servers connected between the first server 220 and the VPN server. When the server in the server cluster (the plurality of servers connected between the first server 220 and the VPN server 240) initiates for the first time, the first-initiated server starts a simulated GRE request response to the GRE protocol simulation test server 310. If the server can successfully complete the request response, then the server is determined to support the GRE protocol. That is, the server is a second server. Based on the above method, all the servers (i.e., second servers) that support the GRE protocol can be selected from the server cluster to further form the second server cluster 230 as an acceleration system.

The first server 220 is connected to one or more second servers in the second server cluster 230. The VPN server 240 is also connected to one or more second servers in the second server cluster 230.

Furthermore, the PPTP VPN system is based on PPTP VPN, which can use both the GRE and PPTP protocols at the same time. The source IP addresses of both protocols are the same.

The First Embodiment

Figure 4:
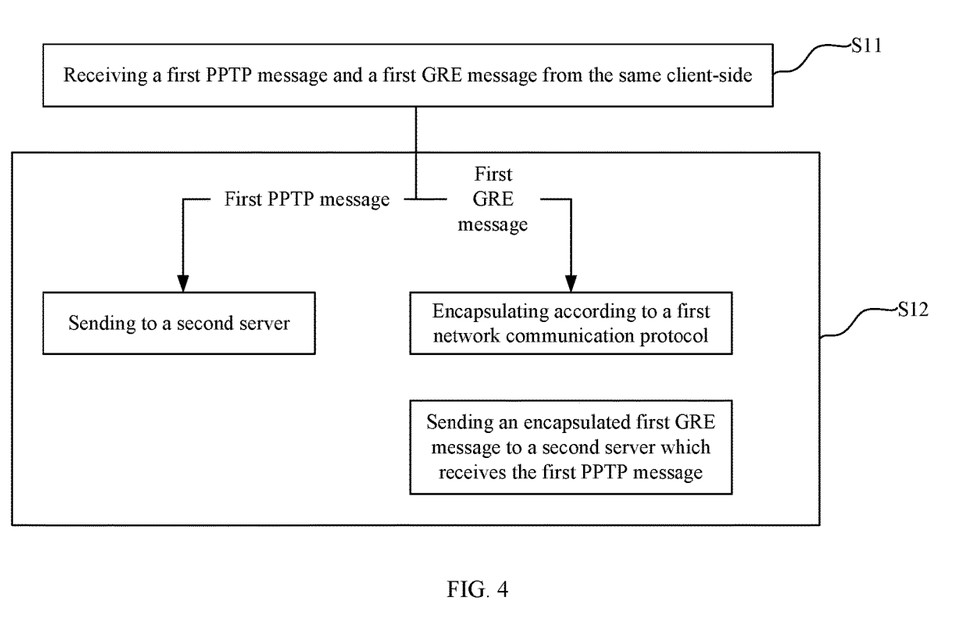
FIG. 4 is a flow chart of a method for PPTP VPN based access acceleration according to an embodiment of the present disclosure.

When the client-side 210 sends a request for a first PPTP message and a first GRE message, on the first server 220, the first PPTP message and the first GRE message are in accordance with the steps shown in FIG. 4 for access acceleration based on the PPTP VPN.

Step S11, receiving the first PPTP message and the first GRE message from the same client-side 210.

The first PPTP message sent out by the client-side 210 is a link request of the PPTP, and the first GRE message is a GRE transmission request.

After receiving the messages from the client-side 210, the received messages are distinguished based on the PPTP and GRE protocols to obtain the first PPTP message and the first GRE message.

Step S12, for the first PPTP message, the first PPTP message is sent to the second server. For the first GRE message, the first GRE message is encapsulated based on a first network communication protocol and the encapsulated first GRE message is sent to the second server which receives the first PPTP message.

For the first PPTP message, the IP address of the client-side 210 is extracted and the Hash calculation is performed on the IP address of the client-side 210 to acquire the IP address of the second server, and the first PPTP message is sent to the second server according to the IP address of the second server. In the present embodiment, the second server that receives the first PPTP message is the second server 231. That is, the IP address obtained by the Hash calculation is the IP address of the second server 231.

For the first GRE message, two parts are processed:

First, the first GRE message is encapsulated based on the first network communication protocol.

The GRE protocol is a common routing encapsulation protocol, which can encapsulate packages of certain network protocols so that the encapsulated packages can be transmitted over another network layer protocol. The GRE protocol lacks of encryption mechanism, and has no standard control protocol to ensure the stability and reliability of transmission. That is, if the transmission between two servers directly uses the GRE protocol, data packet loss during transmission cannot be guaranteed, which will seriously affect the transmission efficiency and transmission quality. Moreover, in the PPTP VPN system, there is no guarantee that GRE messages can be transmitted on the line between two servers.

Figure 5:
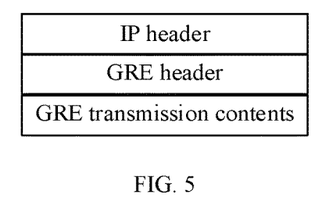
FIG. 5 is a schematic diagram of a common GRE message format.
Figure 6:
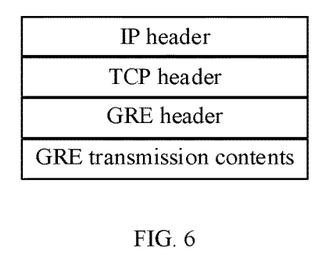
FIG. 6 is a schematic diagram of a format of a GRE message encapsulated using TCP protocol, according to the method for PPTP VPN based access acceleration disclosed in embodiments of the present disclosure.

Accordingly, the present embodiment performs re-encapsulation of the first GRE message based on the first network communication protocol. The first network communication protocol is a network communication protocol that supports the transmission of data packets between the first server and the second server in the process of network communication. The first network communication protocol includes, but is not limited to, TCP protocol, UDP protocol, and so on. In the present embodiment, the first network communication protocol encapsulates the first GRE message by using the TCP protocol having high reliability and strong versatility. Specifically, the format of the first GRE message is shown in FIG. 5, which includes an IP header, a GRE header, and the GRE transmission content. A TCP header is added between the IP header and the GRE header of the original first GRE message. The format of the encapsulated first GRE message is shown in FIG. 6.

Second, the encapsulated first GRE message is sent to the second server that receives the first PPTP message.

The IP address of the client-side 210 is extracted based on the first GRE message and the Hash calculation is performed on the IP address of the client-side 210 to obtain an IP address. With the same IP address of the client-side 210, thus, the IP address obtained by the Hash calculation is the same as the IP address of the second server obtained by calculating according to the first PPTP message, which is the IP address of the second server 231. The encapsulated first GRE message is transmitted to the second server 231 according to the IP address acquired by Hash calculation. Thus, the first PPTP message and the encapsulated first GRE message are sent to the same second server 231.

Since the first PPTP message and the encapsulated first GRE message are sent to the same second server 231, it is further ensured that the PPTP protocol and the GRE protocol use the same IP for back-to-the-source.

Moreover, the second server 231 may be a transmission ingress point into which the messages (the first PPTP message and the encapsulated first GRE message) enter the second server cluster 230. Within the second server cluster 230, a route with the lowest back-to-the-source latency is selected for the messages transmission. The route with the lowest back-to-the-source latency refers to based on passing through the second server 231, a route between the first server 220 and the VPN server 240 with the lowest back-to-the-source latency. On the route with the lowest back-to-the-source latency, the second server 232 closest to the VPN server 240 may be the transmission egress point of the messages (the messages sent from the VPN server 240 are different from the messages received from the first server 220) in the second server cluster 230. Eventually the messages are outputted to the VPN server 240. In addition, the determination of the route with the lowest back-to-the-source latency is a very mature routing determination technology, which will not be repeated herein.

The first server 220 sends the first PPTP message and the encapsulated first GRE message to the second server 231. Starting from the second server 231, the first PPTP message and the encapsulated first GRE message are transmitted in the second server cluster 230 in accordance with the route with the lowest back-to-the-source latency until to the second server 232 closest to the VPN server 240. On the second server 232, the access acceleration based on the PPTP VPN is performed according to the procedures shown in FIG. 7.

Figure 7:
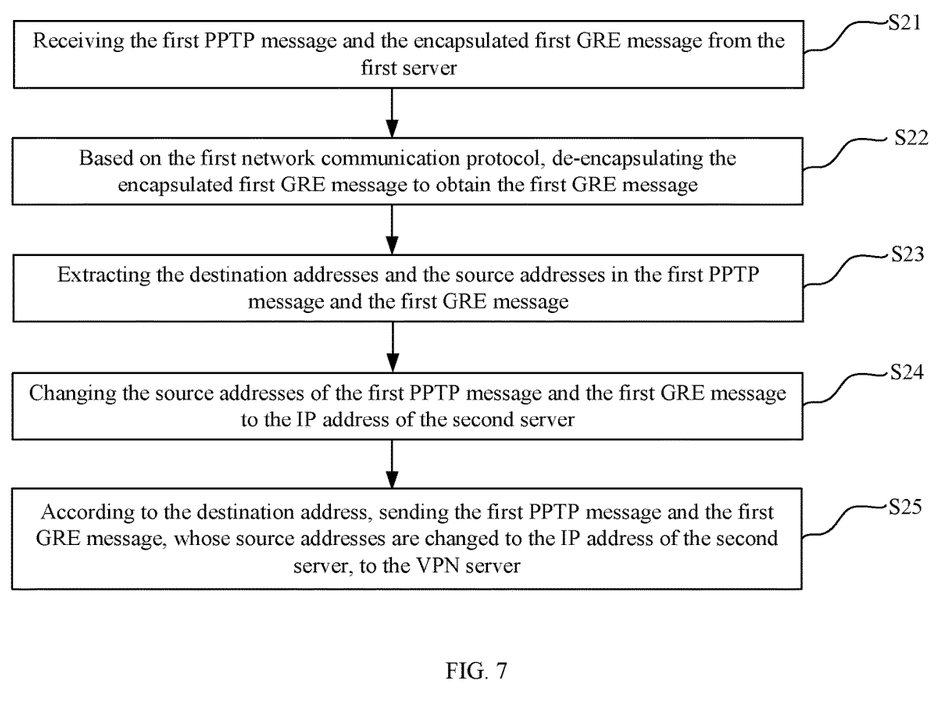
FIG. 7 is a flow chart of a method for PPTP VPN based access acceleration according to another embodiment of the present disclosure.

Step S21, receiving the first PPTP message and the encapsulated first GRE message from the first server 220.

Step S22, based on the first network communication protocol, de-encapsulating the encapsulated first GRE message to obtain the first GRE message.

The transparent transmission based on the GRE protocol is still utilized between the second server 232 and the VPN server 240. Thus, the encapsulated first GRE message received at the second server 232 is de-encapsulated based on the first network communication protocol. Corresponding to the first GRE message on the first server 220, in the present embodiment, the encapsulated first GRE message herein is also de-encapsulated based on the TCP protocol. Specifically, that is, the TCP message header encapsulated in the first GRE message is removed.

Step 23, the destination addresses and the source addresses in the first PPTP message and the first GRE message are extracted, where the destination addresses are the IP address of the VPN server 240, and the source addresses are the IP address of the client-side 210.

No matter it is the PPTP message or the GRE message, in which the source address information and destination address information are stored. In the present embodiment, the destination addresses of both the first PPTP message and the first GRE message are the IP address of the VPN server 240, and the source addresses are the IP address of the client-side 210.

Step S24, the source addresses of the first PPTP message and the first GRE message are changed to the IP address of the second server. The second server is arranged on the route between the first server and the VPN server and is closest to the VPN server.

Step S25, According to the destination addresses, the first PPTP message and the first GRE message, whose source addresses are changed to the IP address of the second server, are sent to the VPN server.

The above process is a process of initiating a request from the client-side 210 to the VPN server 240. Accordingly, the VPN server 240 also performs a respond to the request and finally sends the response result back to the client-side 210.

Because the source addresses of both the first PPTP message and the first GRE message sent to the VPN server 240 are changed to the IP address of the second server, the VPN server 240 send the second PPTP message and the second GRE message, which are fed back for the first PPTP message and the first GRE message, directly back to the second server 232.

Figure 8:
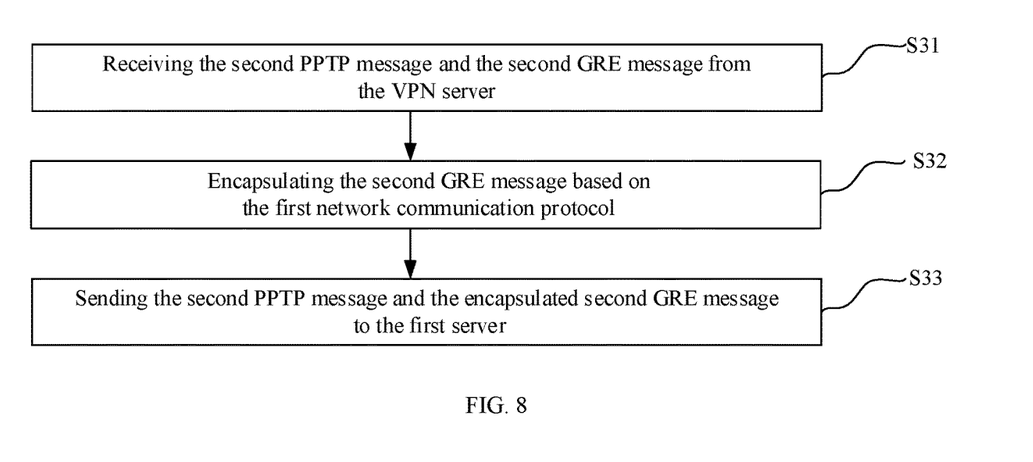
FIG. 8 is a flow chart of a method for PPTP VPN based access acceleration according to another embodiment of the present disclosure.

On the second server 232, an access acceleration based on the PPTP VPN is performed according to the procedures shown in FIG. 8.

Step S31, receiving the second PPTP message and the second GRE message from the VPN server 240.

Step S32, encapsulating the second GRE message based on the first network communication protocol.

The data transmission within the second server cluster 230, and between the second server cluster 230 and the first server 220 is based on the PPTP protocol and the first network communication protocol. Therefore, on the second server 232, the second GRE message is also need to encapsulate based on the first network communication protocol. In the present embodiment, the second GRE message is also encapsulated based on the TCP protocol. That is, the TCP message header is added to the second GRE message.

Step S33, sending the second PPTP message and the encapsulated second GRE message to the first server 220.

The transmission process of the second PPTP message and the encapsulated second GRE message in the second server cluster 230 corresponds to the transmission process of the first PPTP message and the encapsulated first GRE message. According to the transmission path of the first PPTP message and the encapsulated first GRE message in the second server cluster 230, the second PPTP message and the encapsulated second GRE message are forwarded back to the second server 231 and then back to the first server 220 via the second server 231.

Figure 9:
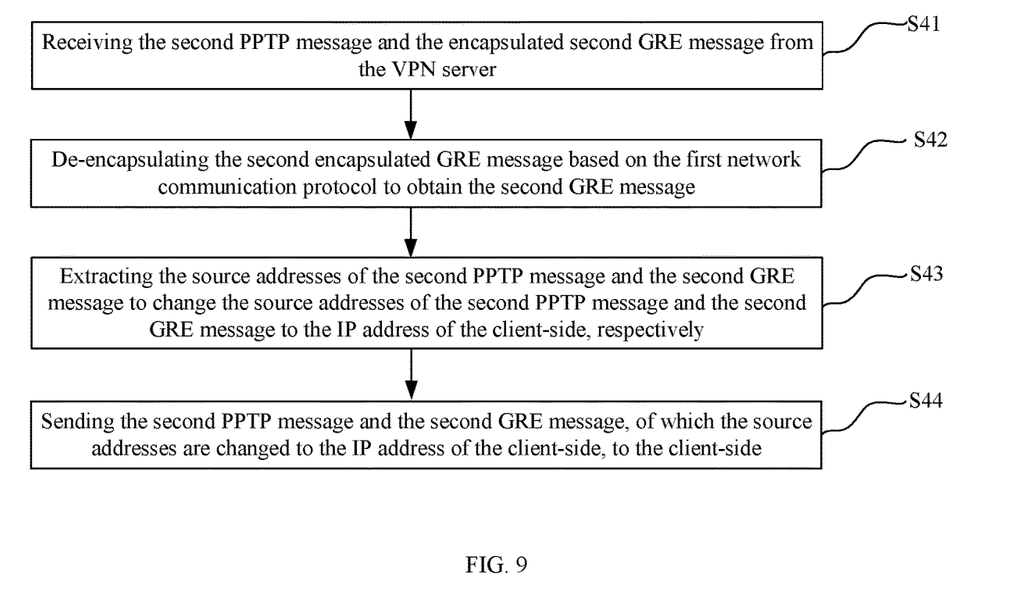
FIG. 9 is a flow chart of a method for PPTP VPN based access acceleration according to another embodiment of the present disclosure.

On the first server 220, the second PPTP message and the encapsulated second GRE message are in accordance with the steps shown in FIG. 9 for access acceleration based on the PPTP VPN.

Step S41, receiving the second PPTP message and the encapsulated second GRE message from the VPN server 240.

The messages received by the first server 220 are not the second PPTP message and the second GRE message directly fed back by the VPN server 240. The received messages are the messages processed by the second server 232. That is, the second PPTP message and the encapsulated second GRE message.

Step S42, the second encapsulated GRE message is de-encapsulated based on the first network communication protocol to obtain the second GRE message.

In the present embodiment, the de-encapsulation process is to remove the TCP message header, which is added on the second GRE packet during encapsulating.

Step S43, extracting the source addresses of the second PPTP message and the second GRE message to change the source addresses of the second PPTP message and the second GRE message to the IP address of the client-side 210, respectively. The source address extracted from the second PPTP message is the IP address of the second server 232, which is arranged on the route with the lowest back-to-the-source latency and is closest to the VPN server.

Step S44, sending the second PPTP message and the second GRE message, of which the source addresses are changed to the IP address of the client-side 210, to the client-side 210.

The steps of the above methods are divided merely for the sake of clarity. In implementation, the steps can be combined into one step or certain steps can be broken down into multiple steps. As long as having the same logical relationship, they are within the scope of the protection of this patent. Adding insignificant modifications or introducing insignificant designs to algorithms or processes without changing the core design of the algorithms and processes is within the scope of the patent.

The Second Embodiment

Figure 10:
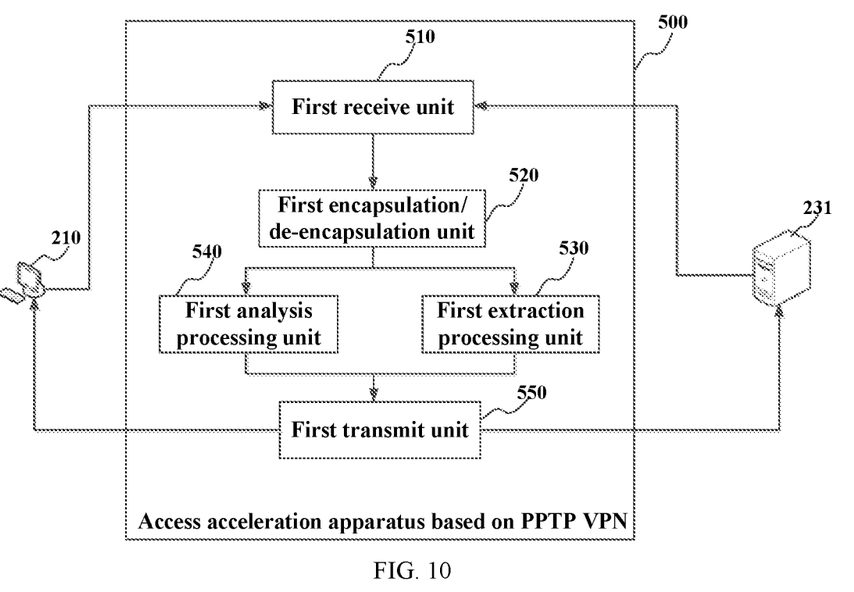
FIG. 10 is a schematic diagram of a PPTP VPN based access acceleration apparatus according to an embodiment of the present disclosure.

The present embodiment discloses a PPTP VPN based access acceleration apparatus 500, which is applied to the first server 220, as shown in FIG. 10, and includes the followings.

A first receive unit 510 configured to receive a first PPTP message and a first GRE message from the same client-side 210, and a second PPTP message and an encapsulated second GRE message from the VPN server 240 that are fed back via the second server.

A first encapsulation/de-encapsulation unit 520 configured, based on the first network communication protocol, to encapsulate the first GRE message and de-encapsulate the encapsulated second GRE message.

The first network communication protocol is a network communication protocol that supports the transmission of data packets between the first server and the second server in the process of network communication. The first network communication protocol includes, but is not limited to, TCP protocol, UDP protocol, and so on. In the present embodiment, the TCP protocol having high reliability and strong versatility is utilized. The encapsulation of the first GRE message is to add a TCP header in the first GRE message, and the de-encapsulation of the second GRE message is to remove the TCP header added in the second GRE message.

A first extraction processing unit 530 configured to extract the source addresses in the second PPTP message and the second GRE message, and change the source addresses in the second PPTP message and the second GRE message to the IP address of the client-side 210. The source address extracted from the second PPTP message is the IP address of the second server 232, which is arranged on the route with the lowest back-to-the-source latency and is closest to the VPN server.

A first analysis processing unit 540 configured to: extract the IP address of the client-side 210 from the first PPTP message and the first GRE message, respectively; perform the Hash calculation on the IP address of the client-side 210 extracted from the first PPTP message to obtain the IP address of the second server 231; and obtain an IP address by performing Hash calculation on the IP address of the client-side 210 extracted from the first GRE message, which is same as the IP address of the second server 231 obtained by calculating according to the first PPTP message.

A first transmit unit 550 configured, according to the IP address obtained by the analysis processing of the first analysis processing unit 540, to send the first PPTP message and the encapsulated first GRE message to the second server 231 in the second server cluster 230; and to send the second PPTP message and the second GRE message, of which the source addresses are changed to the IP address of the client-side 210, to the client-side 210.

In addition, in order to highlight the innovative parts of the present invention, the present embodiment does not introduce units that are not closely related to the technical problem proposed by the present invention, which does not indicate that no other elements exist in the present embodiment.

The Third Embodiment

Figure 11:
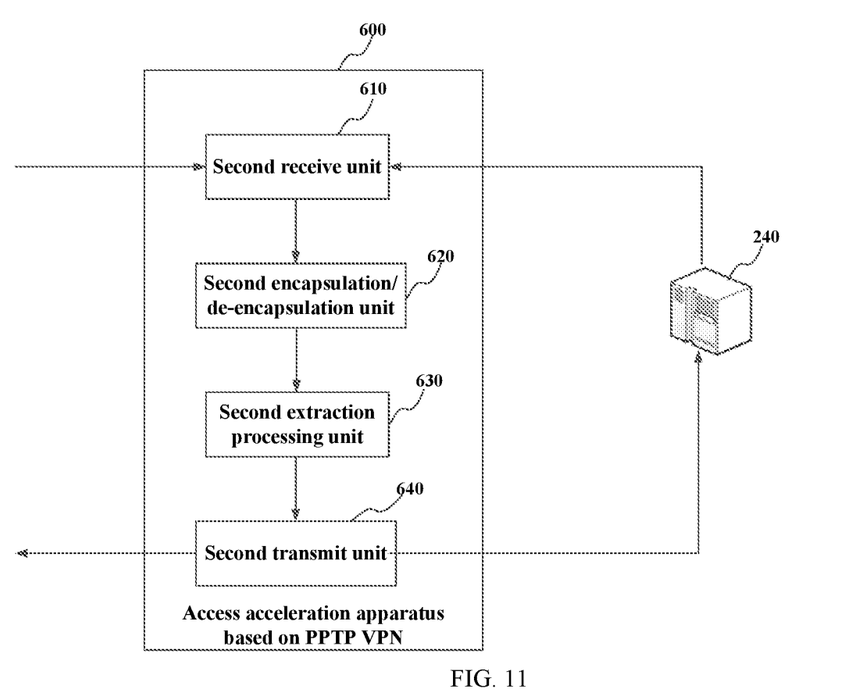
FIG. 11 is a schematic diagram of a PPTP VPN based access acceleration apparatus according to another embodiment of the present disclosure.

The present embodiment discloses a PPTP VPN based access acceleration apparatus 600, which is applied to the second server 232, as shown in FIG. 11, and includes the followings.

A second receive unit 610 configured to receive a first PPTP message and an encapsulated first GRE message from the first server 220, and a second PPTP message and a second GRE message from the VPN server 240.

A second encapsulation/de-encapsulation unit 620 configured, based on the first network communication protocol, to encapsulate the first GRE message and de-encapsulate the encapsulated second GRE message.

The first network communication protocol is a network communication protocol that supports the transmission of data packets between the first server and the second server in the process of network communication. The first network communication protocol includes, but is not limited to, TCP protocol, UDP protocol, and so on. In the present embodiment, the TCP protocol having high reliability and strong versatility is utilized. The encapsulation of the first GRE message is to add a TCP header in the first GRE message, and the de-encapsulation of the second GRE message is to remove the TCP header added in the second GRE message.

A second extraction processing unit 630 configured to extract the source addresses in the first PPTP message and the first GRE message, and change the source addresses in the first PPTP message and the first GRE message to the IP address of the second server 232. The extracted IP addresses are the IP address of the client-side 210.

A second transmit unit 640 configured to send the first PPTP message and the first GRE message, of which the source addresses are changed to the IP address of the second server, to the VPN server 240, and send the second PPTP message and the encapsulated second GRE message to the first server 220.

In addition, in order to highlight the innovative parts of the present invention, the present embodiment does not introduce units that are not closely related to the technical problem proposed by the present invention, which does not indicate that no other elements exist in the present embodiment.

It is not difficult to find that the first embodiment is a method embodiment corresponding to the second embodiment or the third embodiment, and the first embodiment may be implemented in cooperation with the second embodiment or the third embodiment. The related technical details mentioned in the first embodiment are still valid in the second embodiment or the third embodiment, which, for the sake of reducing repetition, will not be described again in the second embodiment or the third embodiment. Accordingly, the related technical details mentioned in the second embodiment or the third embodiment may also be applied in the first embodiment.

The method, apparatus, and device for PPTP VPN based access acceleration, which are provided by the present disclosure, utilize the Hash algorithm to calculate the IP address of the same client-side. Therefore, the IP address of the same second server under the minimum consumption can be obtained. In order to ensure the stability of data transmission, the GRE messages are encapsulated on the first server based on the TCP protocol, which improves the quality of user access. In the whole PPTP VPN system, what the user sends from the client is a GRE message, and what the user receives is the same GRE message. The entire process of data transmission is transparent to the user, and through the underlying protocol to further ensure the reliability of transmission, reducing the data packet loss phenomenon. Based on the acceleration of the second server cluster of the present invention, the speed at which the user accesses the source station is greatly accelerated. Therefore, the present invention effectively overcomes the shortcomings of the conventional technologies and has a high degree of industrial use value.

The above-mentioned embodiments are merely illustrating the principles and effects of the present invention and are not intended to limit the present invention. Any person skilled in the art can modify or alter the above-mentioned embodiments without departing from the spirit and scope of the invention. Therefore, any equivalents, advantages, or alternations within the spirit and principles of the present disclosure performed by the person who have the common knowledge in the technical fields are intended to be encompassed within the claims of the present invention.

What is claimed is:

1. A method for PPTP (Point to Point Tunneling Protocol) VPN (virtual private network) based access acceleration, wherein a PPTP VPN system includes a client-side, a first server, a VPN server, and a second server cluster supporting a GRE (Generic Routing Encapsulation) protocol connected between the first server and the VPN server, and the second sever cluster is an acceleration system, the method for PPTP VPN based access acceleration comprising:

receiving a first PPTP message and a first GRE message from the same client-side;

for the first PPTP message, sending the first PPTP message to a second server;

for the first GRE message, encapsulating the first GRE message based on a first network communication protocol and sending the encapsulated first GRE message to the second server receiving the first PPTP message;

receiving a second PPTP message and an encapsulated second GRE message from the VPN server;

de-encapsulating the encapsulated second GRE message based on the first network communication protocol to obtain a second GRE message;

extracting source addresses in the second PPTP message and the second GRE message, and changing the source addresses in the second PPTP message and the second GRE message to the IP address of the client-side; and sending the second PPTP message and the second GRE message, of which the source addresses are changed to the IP address of the client-side, to the client-side.

2. The method for PPTP VPN based access acceleration according to claim 1, wherein the first network communication protocol is a network communication protocol that supports the transmission of data packets between the first server and the second server in the process of network communication.

3. The method for PPTP VPN based access acceleration according to claim 1, wherein the first sever is connected with the client-side or the first server is a virtual server arranged on the client-side.

4. The method for PPTP VPN based access acceleration according to claim 1, wherein:

IP (Internet Protocol) addresses of the client-side are extracted from the first PPTP message and the first GRE message, respectively;

a Hash calculation is performed on the IP address of the client-side extracted from the first PPTP message to obtain an IP address of the second server, and according to the IP address of the second server obtained from the Hash calculation, the first PPTP message is sent to the second server; and the Hash calculation is performed on the IP address of the client-side extracted from the first GRE message to obtain an IP address same as the IP address of the second server obtained by calculating according to the first PPTP message, and the first PPTP message and the encapsulated first GRE message are sent to the same second server.

5. The method for PPTP VPN based access acceleration according to claim 1, wherein:

the second server cluster includes a plurality of second servers; and the plurality of second servers in the second server cluster are obtained by screening through GRE message interactive communication with a preset GRE protocol simulation test server.

6. A PPTP VPN based access acceleration apparatus, wherein a PPTP VPN system includes a client-side, a first server, a VPN server, and a second server cluster supporting a GRE protocol connected between the first server and the VPN server, and the second sever cluster is an acceleration system, the PPTP VPN based access acceleration apparatus comprising:

a first receive unit configured to receive a first PPTP message and a first GRE message from a same client-side and a second PPTP message, and to an encapsulated second GRE message from the VPN server that are fed back via the second server;

a first encapsulation/de-encapsulation unit configured, based on a first network communication protocol, to encapsulate the first GRE message and de-encapsulate the encapsulated second GRE message;

a first extraction processing unit configured to extract source addresses in the second PPTP message and a second GRE message, and change the source addresses in the second PPTP message and the second GRE message to an IP address of the client-side; and a first transmit unit configured to send the first PPTP message and an encapsulated first GRE message to the second server, and send the second PPTP message and the second GRE message, of which the source addresses are changed to the IP address of the client-side, to the client-side.

7. The PPTP VPN based access acceleration apparatus according to claim 6 further includes:

a first analysis processing unit configured to extract the IP address of the client-side from the first PPTP message and the first GRE message, respectively; perform Hash calculation on the IP address of the client-side extracted from the first PPTP message to obtain an IP address of the second server; perform the Hash calculation on the IP address of the client-side extracted from the first GRE message to obtain an IP address same as the IP address of the second server obtained by calculating according to the first PPTP message; and the first transmit unit configured, according to analysis processing result of the first analysis processing unit, to send the first PPTP message and the encapsulated first GRE message to the same second server.

8. The PPTP VPN based access acceleration apparatus according to claim 6, wherein the first network communication protocol is a network communication protocol that supports the transmission of data packets between the first server and the second server in the process of network communication.

9. A device utilizing the PPTP VPN based access acceleration apparatus according to claim 6.

10. A method for PPTP VPN based access acceleration, wherein a PPTP VPN system includes a client-side, a first server, a VPN server, and a second server cluster supporting a GRE protocol connected between the first server and the VPN server, and the second sever cluster is an acceleration system, the method for PPTP VPN based access acceleration comprising:

receiving a first PPTP message and an encapsulated first GRE message from the first server;

de-encapsulating the encapsulated first GRE message based on a first internet communication protocol to obtain a first GRE message;

extracting destination addresses and source addresses in the first PPTP message and the first GRE message, wherein the destination addresses are an IP address of the VPN server, and the source addresses are an IP address of the client-side;

changing the source addresses of the first PPTP message and the first GRE message to an IP address of a second server; wherein the second server is arranged on the route between the first server and the VPN server and is closest to the VPN server; and according to the destination addresses, sending the first PPTP message and the first GRE message, whose source addresses are changed to the IP address of the second server, to the VPN server.

11. The method for PPTP VPN based access acceleration according to claim 10, wherein the first network communication protocol is a network communication protocol that supports the transmission of data packets between the first server and the second server in the process of network communication.

12. The method for PPTP VPN based access acceleration according to claim 10, wherein the first sever is connected with the client-side or the first server is a virtual server arranged on the client-side.

13. The method for PPTP VPN based access acceleration according to claim 10, wherein the second server in the second server cluster is obtained by screening through GRE message interactive communication with a preset GRE protocol simulation test server.

14. The method for PPTP VPN based access acceleration according to claim 10 further including:
   receiving a second PPTP message and a second GRE message from the VPN server;
   encapsulating the second GRE message based on the first network communication protocol; and
   sending the second PPTP message and an encapsulated second GRE message to the first server.

15. A PPTP VPN based access acceleration apparatus, wherein a PPTP VPN system includes a client-side, a first server, a VPN server, and a second server cluster connected between the first server and the VPN server, and the second sever cluster is an acceleration system, the PPTP VPN based access acceleration apparatus comprising:
   a second receive unit configured to receive a first PPTP message and an encapsulated first GRE message from the first server, and a second PPTP message and a second GRE message from the VPN server;
   a second encapsulation/de-encapsulation unit configured, based on the first network communication protocol, to encapsulate the first GRE message and de-encapsulate an encapsulated second GRE message;
   a second extraction processing unit configured to extract source addresses in the first PPTP message and a first GRE message, and change the source addresses in the first PPTP message and the first GRE message to an IP address of the second server, wherein the extracted IP addresses are an IP address of the client-side; and
   a second transmit unit configured to send the first PPTP message and the first GRE message, of which the source addresses are changed to the IP address of the second server, to the VPN server, and send the second PPTP message and an encapsulated second GRE message to the first server.

16. A PPTP VPN based access acceleration apparatus according to claim 15, wherein the first network communication protocol is a network communication protocol that supports the transmission of data packets between the first server and a second server in the process of network communication.

17. A device utilizing the PPTP VPN based access acceleration apparatus according to claim 15.

* * * * *